United States Patent [19]

Shane

[11] Patent Number: 4,811,851

[45] Date of Patent: Mar. 14, 1989

[54] SHELF ORGANIZER

[75] Inventor: Barry Shane, West Hartford, Conn.

[73] Assignee: JMC Black, Inc., Rockville, Conn.

[21] Appl. No.: 118,879

[22] Filed: Nov. 9, 1987

[51] Int. Cl.⁴ .............................................. A47F 7/00
[52] U.S. Cl. ......................................... 211/41; 211/71
[58] Field of Search ..................... 211/41, 40, 88, 71, 211/42; 206/387, 453, 454, 455, 456

[56] References Cited

U.S. PATENT DOCUMENTS

| | | | |
|---|---|---|---|
| 3,138,261 | 6/1964 | Witteborg | 211/41 |
| 4,307,809 | 12/1981 | Haswell | 211/40 |
| 4,573,588 | 3/1986 | Cohen | 211/41 |
| 4,684,030 | 8/1987 | Gurzynski | 211/88 |

FOREIGN PATENT DOCUMENTS

| | | | |
|---|---|---|---|
| 658994 | 5/1965 | Belgium | 211/43 |
| 244308 | 4/1947 | Switzerland | 211/41 |
| 561041 | 4/1975 | Switzerland | 211/42 |

Primary Examiner—Robert W. Gibson, Jr.
Attorney, Agent, or Firm—John H. Crozier

[57] ABSTRACT

A shelf organizer having a plurality of parallel vertical slots, each slightly wider than the thickness of each item of merchandise to be displayed, the slots being disposed at an acute angle to the back of the shelf. When videotape cartons are displayed, the depth of each of the slots may be one-quarter to one-third the width of one carton and the height of each of the slots may be about one-half the height of one carton. One preferred embodiment allows a shelf loading increase of over 50%, while over 80% of the graphics on the face of each carton remain easily viewed. Also, this arrangement displays the title on one side edge of each carton. The organizer is preferably constructed of a light, rigid material, such as expanded polystyrene, which can be easily cut to length and which can be simply installed in new or existing shelving through the use of adhesive strips.

8 Claims, 1 Drawing Sheet

U.S. Patent   Mar. 14, 1989   4,811,851
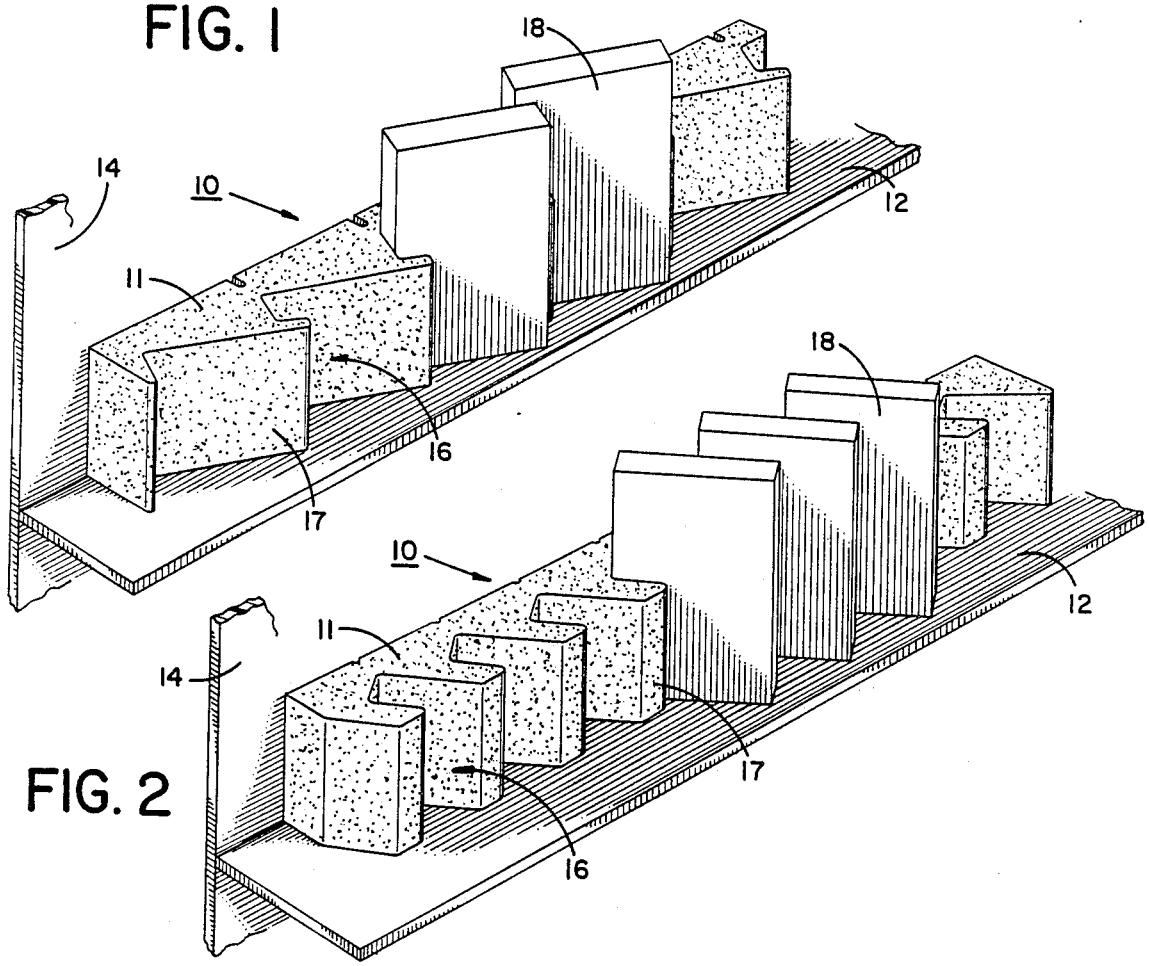

SHELF ORGANIZER

BACKGROUND OF THE INVENTION

1. Field of the Invention

This invention relates to shelf organizers, in general, and, more particularly, to a shelf organizer for the display of items of merchandise. While the present invention has many applications, it has been found especially useful for the display of videotape cartons.

2. Background Art

Videotapes are usually supplied at retail each in a carton having, for example, for VHS tapes, a face side approximately 4 inches wide by 7½ inches high and having a depth of about 1 inch. The face side displays the title of the videotape and includes graphics to attract the attention of prospective purchasers or renters. The side edges also display at least the title. In some establishments that rent and/or sell a large number of videotapes, the videotape cartons (usually without the videotape inside) are displayed on shelves with the cartons positioned flat against the back of each shelf, the bottom of which may be tilted slightly outward, in order to fully display the face of the carton. In other establishments, "tracks" are used to display videotape cartons, the tracks comprising channel-shaped members, attached to walls or other structures, in which channels the bases of the cartons rest. While these arrangements satisfactorily hold the cartons, they require a total shelf or track length that is, for VHS videotapes, about 4 inches times the number of cartons to be displayed. In an establishment with many thousands of titles, many hundreds of feet of shelf space are required. This is expensive, not only in terms of the shelving itself, but also in the required floor space for the shelving. The total shelf length could be reduced by 75 percent if the cartons were positioned in face-to-back configuration so that only the edges of the cartons were visible. This arrangement, however, while displaying the titles of the side edges, would cause the loss of the effect of the graphics.

It would be desirable to have means to hold the cartons in such a position that the graphics on the faces of the cartons were substantially visible to a person facing the shelves, yet to be able to reduce the total shelf length required. It would also be desirable to have such means that could be conveniently retrofitted to existing shelves.

Accordingly, it is a principal object of the present invention to provide a shelf organizer for videotape cartons that holds such cartons for display of substantially all of the graphics on the faces of the cartons, while reducing the total shelf length required.

It is another object of the present invention to provide such a shelf organizer that can be conveniently retrofitted to existing videotape display shelving.

It is a further object of the present invention to provide such a shelf organizer that is quickly, simply, and easily installed, without damaging existing shelving, and without requiring more than a minimum degree of disruption of an existing business.

Other objects of the present invention will, in part, be obvious, and will, in part, appear in the following description.

SUMMARY OF THE INVENTION

The present invention accomplishes the above objects by providing a shelf organizer having a plurality of parallel vertical slots, each slightly wider than the thickness of one carton, the slots being disposed at an acute angle to the back of the shelf. Videotape cartons are placed in these slots the depth of each of which may be one-quarter to one-third the width of one carton and the height of which may be about one-half the height of one carton. One preferred embodiment allows a shelf loading increase of over 50 percent, while over 80 percent of the graphics on the face of each carton remain easily viewed. Also, this arrangement displays the videotape title on one side edge of each carton. The organizer is preferably constructed of a light, rigid material, such as expanded polystyrene, which can be easily cut to length and which can be simply installed in new or existing shelving through the use of double-sided adhesive strips.

BRIEF DESCRIPTION OF THE DRAWING

FIG. 1 is a perspective view of a shelf organizer of the present invention in a "loose" embodiment.

FIG. 2 is a perspective view of a shelf organizer of the present invention in a "dense" embodiment.

FIG. 3 is a side elevation view of a shelf organizer of the present invention including a depth spacer, installed on shelving.

FIG. 4 is a side elevation view of a shelf organizer of the present invention including a bottom extender, installed on shelving.

FIG. 5 is a top plan view of a shelf organizer of the present invention.

DETAILED DESCRIPTION OF THE PREFERRED EMBODIMENTS

Referring now to the drawing, FIGS. 1 and 2 are perspective views of a shelf organizer of the present invention, generally indicated by the reference numeral 10, installed on a shelf comprising a bottom 12 and a back 14. Shelf organizer 10 includes an elongated body 11 which has formed therein a plurality of vertical slots, as at 16, defined by walls, as at 17, into which slots videotape cartons, as at 18, may be removably placed. The width of a slot 16 is lightly greater than the width of a videotape carton 18, so as to hold the carton vertical but still easily removable.

FIG. 1 illustrates an embodiment of the present invention which may be referred to as a "loose pack", as there is some reduction in the length of shelving over the conventional method of display of videotape cartons, but not nearly as much as with the embodiment of the present invention shown on FIG. 2 which may be referred to as a "dense pack". The "dense pack" embodiment permits up to 50% more cartons to be displayed on a shelf over conventional methods. In the "dense pack" embodiment of FIG. 2, slots 16 preferably form an angle of about 55 degrees with shelf back wall 14, while in the "loose pack" embodiment of FIG. 1, the slots preferably form an angle of about 25 degrees with the shelf back wall.

With the "loose pack" embodiment of FIG. 1, walls 17 need only have enough thickness to maintain their structural integrity; however, with the "dense pack" embodiment of FIG. 2, walls 17 should be relatively thick, say on the order of 1-inch thick for VHS videotape cartons 18 to separate the cartons somewhat, so that the graphics on the faces of the cartons are not unduly obscured.

Shelf organizer 10 is preferably formed of an economical and easily cut material such as expanded polystyrene board and can be provided in any desired length for cutting to fit any length of shelving. Expanded polystyrene also has the advantage of being rigid, light, and strong for the intended use. Shelf organizer 10 may be attached to shelving by any conventional method, but is particularly suitable to being attached by the use of patches of double-sided adhesive tape (not shown) and is simply and quickly retrofitted to existing shelving without damage to the shelving or undue disruption to business activities. The shelf organizer may be painted to any desired color to match, or to contrast with, the shelf.

Should the bottom 12 of existing shelving be undesirably deep, one or more depth spacers 20 may be placed between shelf organizer 10 and shelf back 14 to bring the shelf organizer out to the desired position, as shown on FIG. 3. Depth spacer 20 is also preferably constructed of expanded polystyrene board and can also be easily installed with double-sided adhesive tape. Should the bottom 12 of existing shelving be too narrow, an extender 24 may be provided as shown on FIG. 4. Extender 24 is preferably constructed of a relatively rigid, but light, material, such as Masonite, which may also be attached by means of double-sided adhesive tape.

FIG. 5 shows a top plan view of shelf organizer 10 which may include grooves, as at 26, on the back of the shelf organizer and extending from the top to the bottom thereof, preferably at the least thick points of body 11. Grooves may alternatively be formed at the bases of slots 16, as at 28. Grooves 26 or 28 permit the easy manual breaking of shelf organizer 10 to a desired length when the shelf organizer is constructed of a material such as expanded polystyrene board. Of course, shelf organizer 10 may be cut by any suitable conventional method, as well, such as with a saw or with a hot wire cutter.

Thus, what has been described, in the preferred embodiments of the present invention, is a novel shelf organizer that is rigid and strong for the intended use, yet is light, and can be simply and quickly retrofitted to existing, or installed in new, shelving without the use of any tools and without permanently damaging the existing shelving by screw holes or the like. Slots 16 may be any dimension to accommodate whatever videotape cartons 18 are to be displayed and easily removed, and the orientation of the slots permits the videotape cartons to be held upright. Since the degree of insertion of each carton 18 into its slots 16 is limited by the end of the slot, all cartons are inserted the same distance and the resulting display is neat and orderly in appearance.

While the present invention has been described primarily as being used in the display of videotape cartons, it will be understood by anyone skilled in the art that it may be applied, as well, to any use where the attributes of the shelf organizer may be useful.

It will thus be seen that the objects set forth above, among those made apparent from the preceding description are efficiently attained and, since certain changes may be made in the above construction without departing from the scope of the invention, it is intended that all matter contained in the above description or shown on the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A merchandise shelf organizer for retrofitting to an existing shelf, said shelf having a horizontal bottom surface and a vertical back surface, comprising:
    (a) a one piece, elongated body having bottom, top, and back sides, said bottom side and said back side being substantially flat; and
    (b) a front side comprising a plurality of parallel vertical slots defined by walls integral with said body and extending forward at an acute angle with said back side; and
    (c) said body being attachable to said shelf without damage to said shelf, with said bottom side of said body contacting said horizontal bottom surface of said shelf and with said back side of said body contacting said vertical back surface of said shelf; whereby, when said body is attached to a shelf, said merchandise may be inserted into said slots and removably supported therein.

2. A merchandise shelf organizer, as defined in claim 1, wherein said shelf organizer is attached to said shelf with a shelf extender disposed between said bottom side of said body and said top surface of said shelf.

3. A merchandise shelf organizer, as defined in claim 1, wherein said shelf organizer is attached to said shelf with a depth spacer disposed between said back side of said body and said back surface of said shelf.

4. A merchandise shelf organizer, as defined in claim 1, wherein:
    (a) said organizer is adapted to hold a videotape carton in each of said slots;
    (b) the height of said walls is about one-half the height of said videotape cartons; and
    (c) when a videotape carton is fully inserted into one of said slots, the wall adjacent the face side of said videotape carton extends over said face side by about one-quarter to one-third the width of said videotape carton.

5. A merchandise shelf organizer, as defined in claim 4, wherein the thickness of each of said walls is approximately the thickness of one of said videotape cartons.

6. A merchandise shelf organizer, as defined in claim 1, further comprising grooves defined in one of said sides of said body parallel with said walls and disposed at locations between said back side and said slots where the body is substantially narrowest, so that said body may be manually shortened by breaking said body at a selected one of said grooves.

7. A merchandise shelf organizer, defined in claim 1, wherein said body and any attachment accessories thereto are attached to said shelf by means of double-sided adhesive tape.

8. A merchandise shelf organizer, as defined in claim 1, wherein said body is formed of expanded polystyrene.

* * * * *